No. 651,425. Patented June 12, 1900.
J. A. McCONNELL.
PIPE COVERING.
(Application filed July 5, 1899.)
(No Model.)
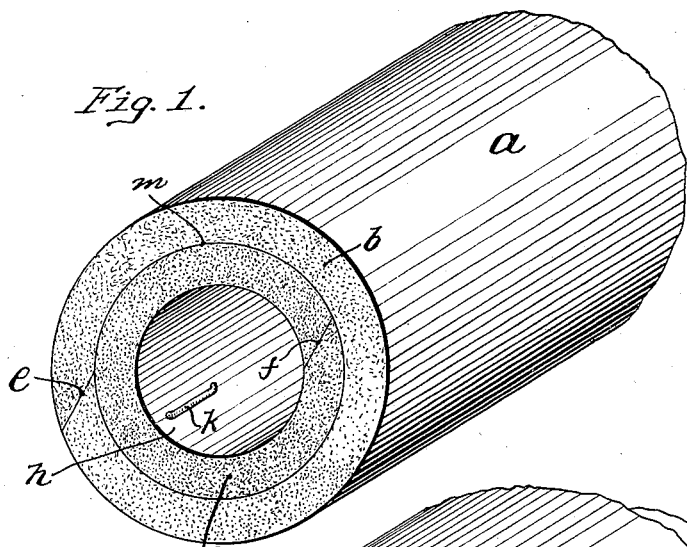
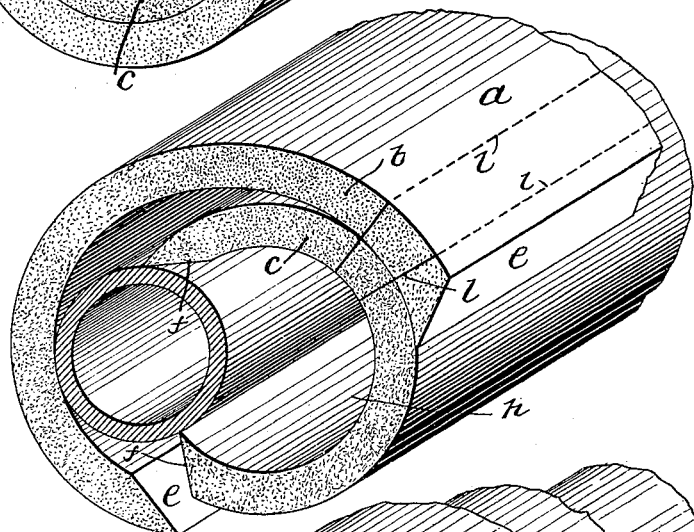
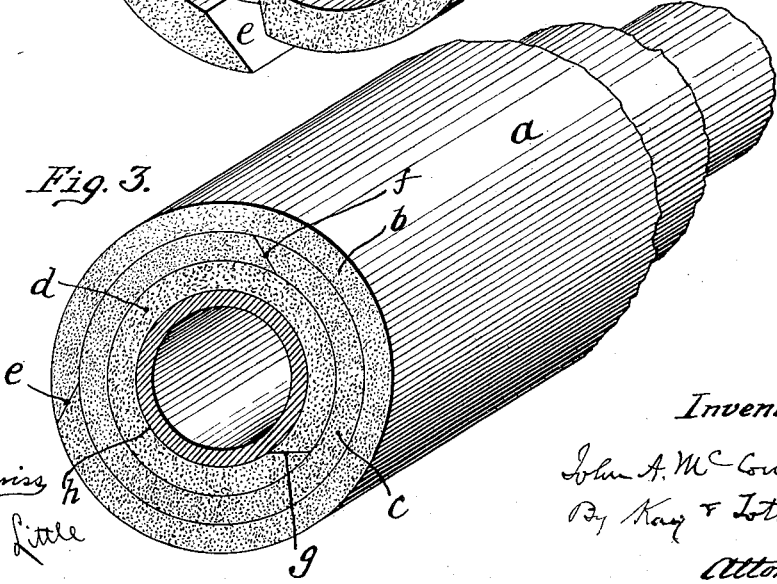
Witnesses:
Inventor:
John A. McConnell
By Kay & Totten
Attorneys

UNITED STATES PATENT OFFICE.

JOHN A. McCONNELL, OF ALLEGHENY, PENNSYLVANIA.

PIPE-COVERING.

SPECIFICATION forming part of Letters Patent No. 651,425, dated June 12, 1900.

Application filed July 5, 1899. Serial No. 722,834. (No model.)

*To all whom it may concern:*

Be it known that I, JOHN A. MCCONNELL, a resident of Allegheny, in the county of Allegheny and State of Pennsylvania, have invented a new and useful Improvement in Pipe-Coverings; and I do hereby declare the following to be a full, clear, and exact description thereof.

My invention relates to non-conducting pipe-coverings. These coverings are employed for insulating purposes, being placed around steam, water, ammonia, refrigerating-pipes, or other cylinders, and prevent radiation of heat through the same.

The present invention has in view to provide a sectional covering which will naturally hold to the pipe and in which the passage from the exterior of the pipe-covering into the central passage is a coiled or circuitous one, so that the great liability of loss of heat and the possibility of the opening of the seams leading from the exterior of the covering into the central chamber of the same are overcome.

The present invention comprises, generally stated, a non-conducting sectional pipe-covering formed of two or more concentric layers of non-conducting material secured together and set in coiled form and having the longitudinal joints in the different layers out of line with each other, so that to place the covering upon the pipe it is first passed through one longitudinal joint or opening and then along the coiled passage-way between the concentric layers and then through another longitudinal joint or opening, and so on, if there are more than two layers, into the central opening of the pipe-chamber of the covering. When the covering is closed and secured in place, the several joints will of course be out of line with each other, and the only possible escape of the heat will be from one such joint around between the concentric layers and then to the other joint, and as such concentric layers form lap-joints and naturally remain in closed position liability of loss of heat in this way is reduced to a minimum.

To enable others skilled in the art to make and use my invention, I will describe the same more fully, referring to the accompanying drawings, in which—

Figure 1 is a perspective view of a short section of the covering. Fig. 2 is a view showing the application of the covering to the pipe, and Fig. 3 is a view showing the covering applied to the pipe.

Like letters indicate like parts in each of the figures.

The covering embodying the invention may be formed of any suitable material—paper, asbestos, or other suitable fibrous material—which can be brought to the desired shape and these materials combined with hair felt, mineral wool, cotton, cork, plastic magnesia, or other fibrous, granular, or plastic materials. For general purposes it is preferred to form the same out of wool paper, asbestos paper, or like materials where more than two such concentric layers are employed. The covering is shown as formed in sections $a$, each section being composed of two or more concentric layers $b\ c\ d$, secured together, Figs. 1 and 2 showing two such layers, while Fig. 3 shows three such layers, the number of layers depending largely upon the uses to which the covering is placed and its desired thickness. Each concentric layer has a longitudinal joint, such as the joints $e\ f\ g$, these joints being formed out of line with each other—for example, as shown in Figs. 1 and 2 the joints being practically on opposite sides, while as shown in Fig. 3 the joints are placed at distances one-third around the covering. The concentric layers are fastened together at any suitable point which will permit the covering to be passed over the pipe, first through the outer joint $e$ and then around through the passage-way between the concentric layers and then in through the next joint, &c., until it reaches the central chamber $h$ of the covering. For this purpose different means for securing the layers together can be employed, according to the thickness and number of layers in the covering. For example, in Fig. 1 two layers are secured together by staples, as at $k$, while in Fig. 2 they are secured together by stitching, as at $l$, or they may be secured together by the use of paste or other adhesive material, which is assumed to be the means employed in the covering of Fig. 3. The joints in each layer may be made by an opening in any desired direction; but I prefer to make the openings diagonal to the body of the covering, as shown, as it provides an easier passage for the pipe, and when the pipe is passed into the central chamber $h$ the covering is closed and secured around the same. It forms a closer joint between the meeting faces of the longitudinal joints in the sections. In this way, though using a series of concentric layers for the covering, it is in effect set in coiled form and having a coiled passage-way from the outer face through to the central chamber. For instance, in Fig. 1 such coiled passage-way is made through the joint $e$, the meeting faces of the two sections $b\ c$, as at $m$, extending around to the joint $f$ and then through the joint $f$ to the central chamber $h$.

The covering can be formed either by forming each concentric section separate, assembling them one around another and securing them together, or, where a number of such layers are employed—as, for example, in paper coverings—by forming the mass together and opening it and cutting through at intervals, so as to obtain, in effect, the concentric layers with longitudinal joints out of line with each other.

When the covering is applied, as it is set so as to hold around the pipe after the pipe is passed through the coiled or circuitous passage to the center, the covering will naturally close around the same, and the covering can be secured in place by staples or other binding means. When so secured, it is evident that there can be practically no loss of heat by passage through the entering-passage from the outside to the center of the covering, because the entrance to any one of such interior passages through any concentric layer is closed by the outer concentric layer, while the passage through the outer concentric layer is closed by the wrapping of that layer around the inner layer, and the joint is so circuitous that there would naturally be no escape of heat.

What I claim as my invention, and desire to secure by Letters Patent, is—

1. As a new article of manufacture, a pipe-covering formed of two or more concentric layers of non-conducting material, each layer being attached to the one adjoining it, and the covering having longitudinal joints in the different layers out of line with each other, substantially as set forth.

2. As a new article of manufacture, a pipe-covering formed of two or more concentric layers of non-conducting material, each layer being attached to the one adjoining it and the covering having longitudinal joints in the different layers out of line with each other, the longitudinal joints of the different layers being formed diagonal to the layers, substantially as set forth.

3. As a new article of manufacture, a pipe-covering formed of two or more concentric layers of non-conducting material, each layer being attached to the one adjoining it, and the covering having longitudinal joints in the different layers out of line with each other, said layers each having an inherent recoil in the non-conducting material tending to keep the covering closed, substantially as set forth.

In testimony whereof I, the said JOHN A. McCONNELL, have hereunto set my hand.

JOHN A. McCONNELL.

Witnesses:
JAMES I. KAY,
ROBERT C. TOTTEN.